United States Patent [19]

Shibata et al.

[11] Patent Number: 4,473,040

[45] Date of Patent: Sep. 25, 1984

[54] FLOW CONTROL DEVICE OF A HELICALLY-SHAPED INTAKE PORT FOR USE IN A DIESEL ENGINE

[75] Inventors: Masahito Shibata; Kiyoshi Nakanishi; Takeshi Okumura; Mutumi Kanda, all of Susono; Tokuta Inoue, Mishima, all of Japan

[73] Assignee: Toyota Jidosha Kabushiki Kaisha, Aichi, Japan

[21] Appl. No.: 400,726

[22] Filed: Jul. 22, 1982

[30] Foreign Application Priority Data

Jul. 30, 1981 [JP] Japan ................................ 56-118513

[51] Int. Cl.³ ............................................ F02M 35/10
[52] U.S. Cl. ................................ 123/188 M; 123/308
[58] Field of Search .................. 123/188 M, 306, 308, 123/432, 52 M

[56] References Cited

U.S. PATENT DOCUMENTS

| 3,850,479 | 11/1974 | Boyhont et al. ...................... 302/29 |
| 4,174,686 | 11/1979 | Shimizu et al. ................ 123/188 M |
| 4,196,701 | 4/1980 | Tamura et al. ................ 123/188 M |
| 4,201,165 | 5/1980 | Tanaka et al. ....................... 123/568 |
| 4,253,432 | 3/1981 | Nohira et al. ..................... 123/52 M |
| 4,256,062 | 3/1981 | Schafer ............................. 123/52 M |
| 4,257,384 | 3/1981 | Matsumoto ........................ 123/575 |
| 4,312,309 | 1/1982 | Nakanishi et al. ............. 123/188 M |
| 4,347,816 | 9/1982 | Saito et al. ........................... 123/308 |

FOREIGN PATENT DOCUMENTS

| 2059008 | 6/1972 | Fed. Rep. of Germany . |
| 143289 | 8/1980 | German Democratic Rep. ............................. 123/188 M |
| 127113 | 9/1977 | Japan . |
| 58129 | 5/1979 | Japan . |
| 19945 | 2/1980 | Japan .................................. 123/308 |
| 54922 | 5/1981 | Japan . |
| 68519 | 4/1982 | Japan . |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A slide valve is arranged in the bypass passage and controlled by a stepper motor so that the opening area of the slide valve changes in proportion to the amount of air to be fed into the cylinder of the engine.

18 Claims, 22 Drawing Figures

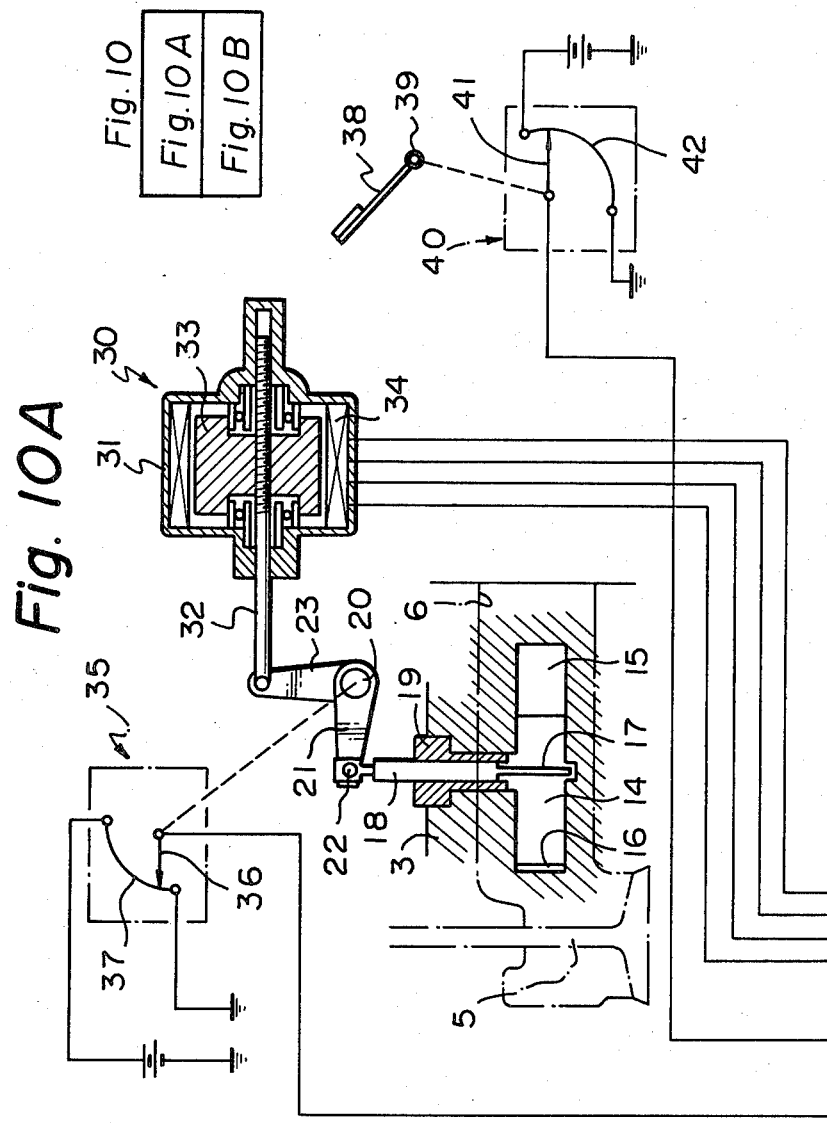

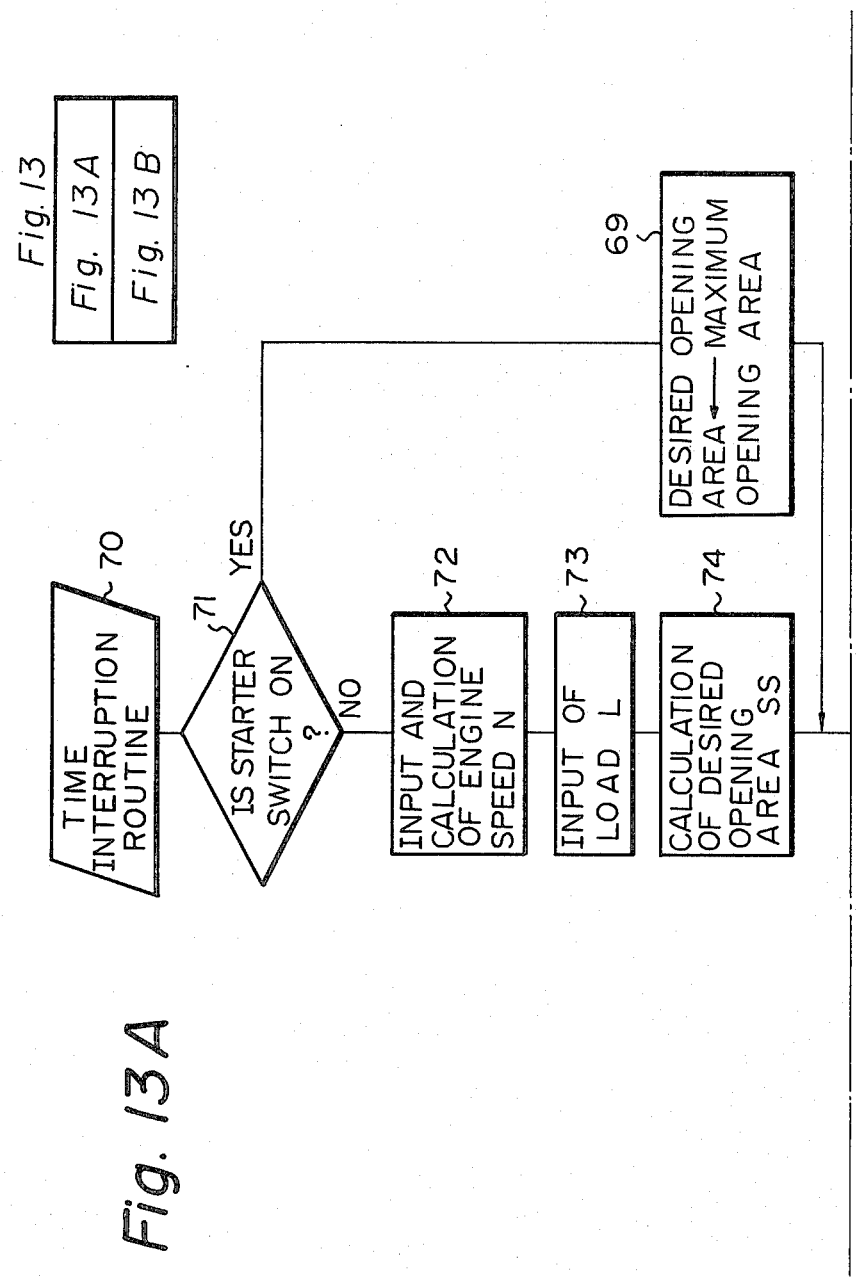

4,473,040

FLOW CONTROL DEVICE OF A HELICALLY-SHAPED INTAKE PORT FOR USE IN A DIESEL ENGINE

BACKGROUND OF THE INVENTION

The present invention relates to a flow control device of a helically-shaped intake port for use in a diesel engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operated at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operated at a high speed under a heavy load, that is, when the amount of air to be fed into the cylinder of the engine is large.

In order to eliminate such a problem, the inventor has proposed a flow control device for use in a gasoline engine. In this flow control device, a bypass passage, branched off from the inlet passage portion and connected to the helix terminating portion of the helical portion, is formed in the cylinder head of an engine, and a normally closed type flow control valve, actuated by an actuator, is arranged in the bypass passage and opened under the operation of the actuator when the amount of air to be fed into the cylinder of the engine becomes larger than a predetermined amount. In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port, thus, enables high volumetric efficiency. This flow control device, however, is just the embodiment of the basic principle of operation and is constructed so that it is suited for a gasoline engine. Consequently, in order to create a swirl motion, suited for a diesel engine, in the combustion chamber without the trade-off of volumetric efficiency, it is necessary to control the amount of air fed into the helical portion from the bypass passage so that such a control is suited for a diesel engine.

SUMMARY OF THE INVENTION

An object of the present invention is to provide a flow control device capable of creating a swirl motion, suited for a diesel engine, in the combustion chamber without the loss of the volumetric efficiency.

According to the present invention, there is provided a device for controlling the flow in a helically-shaped intake port of a diesel engine, said intake port comprising a helical portion formed around an intake valve, and a substantially straight inlet passage portion tangentially connected to the helical portion having a helix terminating portion, said device comprising: a bypass passage branched off from the inlet passage portion connected to the helix terminating portion of the helical portion; a slide valve transversely movable in said bypass passage for controlling the flow area of said bypass passage; and actuating means actuating said slide valve in response to a change in the amount of air to be fed into the cylinder for increasing the flow area of said bypass passage in proportion to an increase of said amount of air required.

The present invention may be more fully understood from the description of a preferred embodiment of the invention set forth below, together with the accompanying drawings.

BRIEF DESCRIPTION OF THE DRAWINGS

In the drawings:

FIGS. 10, 10A, and 10B are views illustrating the entirety of a flow control device;

FIGS. 13, 13A and 13B are a flow chart illustrating the operation of the flow control device;

DESCRIPTION OF A PREFERRED EMBODIMENT

Figure 1:
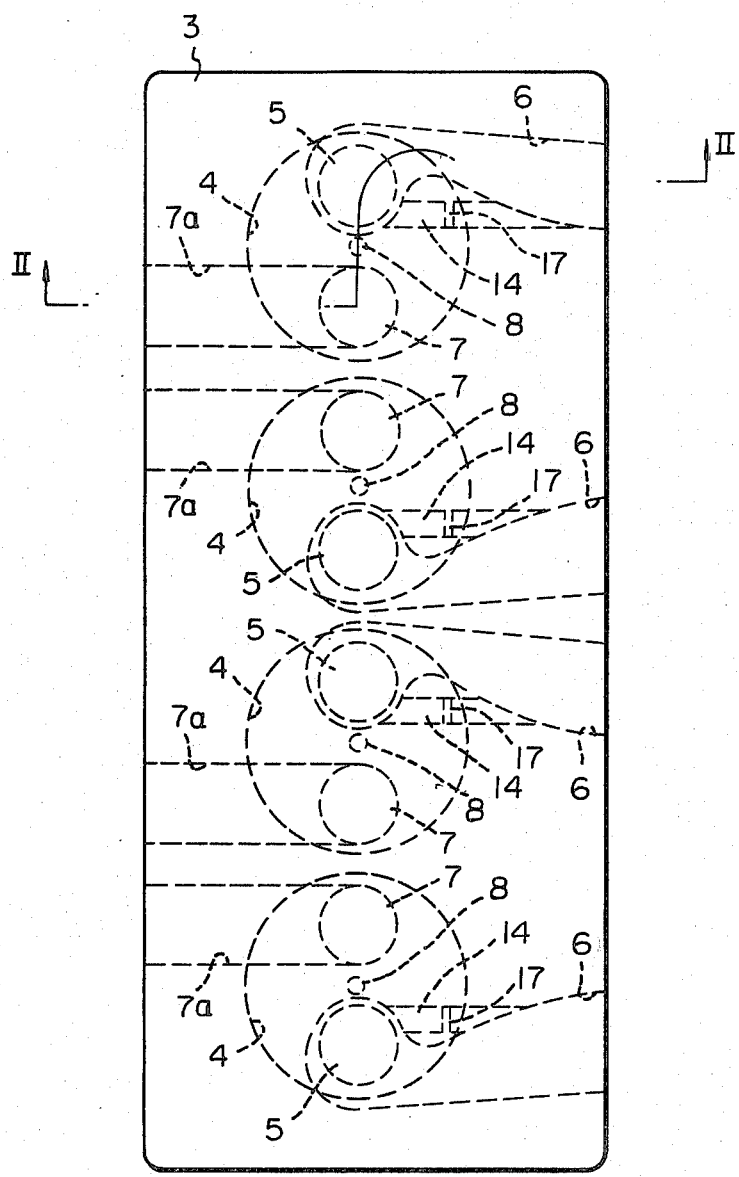
FIG. 1 is a plan view of an internal combustion engine according to the present invention.
Figure 2:
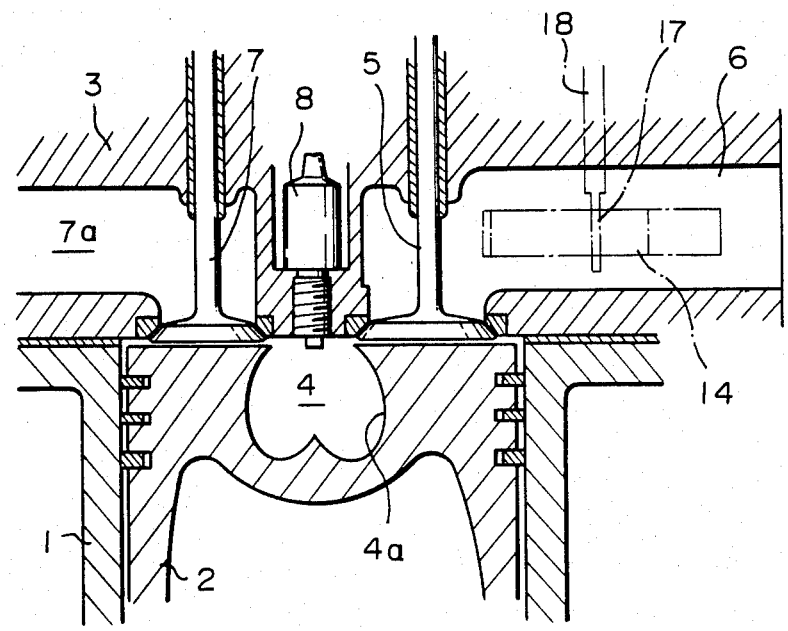
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4a a spherical recess formed on the top face of the piston 2 and defining a combustion chamber 4; 5 designates an intake valve, 6 a helically-shaped intake port formed in the cylinder head 3, 7 an exhaust valve, 7a an exhaust port; and 8 a fuel injector arranged in the combustion chamber 4. Fuel is injected by the fuel injector 8 towards the recess 4a.

Figure 3:
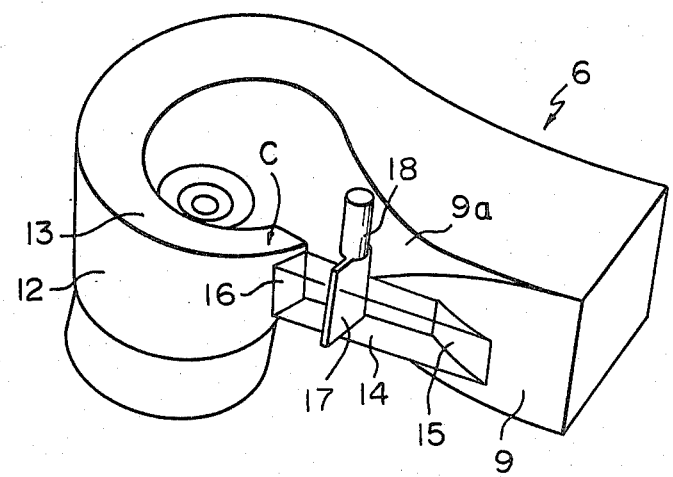
FIG. 3 is a perspective view schematically illustrating the shape of a helically-shaped intake port.
Figure 4:
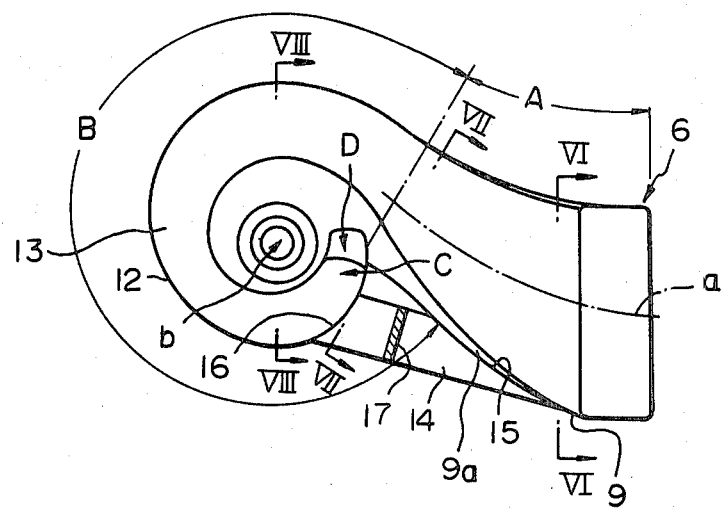
FIG. 4 is a plan view of FIG. 3.
Figure 5:
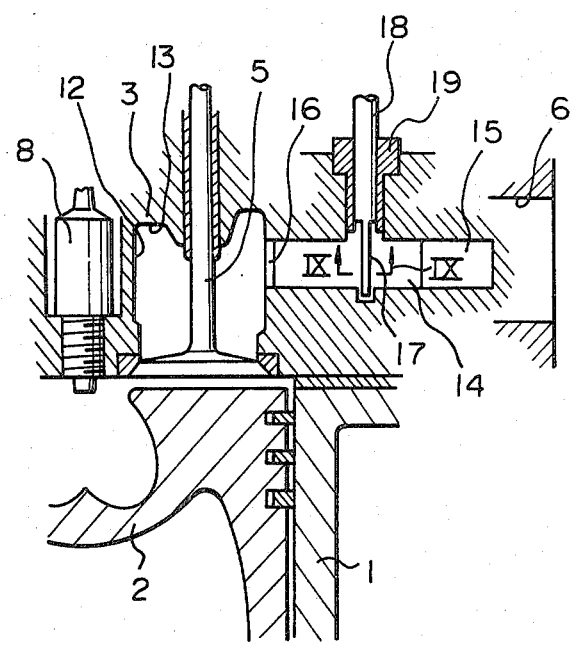
FIG. 5 is a cross-sectional view taken along the bypass passage in FIG. 3.
Figure 6:
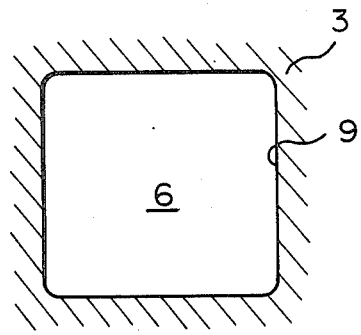
FIG. 6 is a cross-sectional view taken along the line VI—VI in FIG. 4.
Figure 7:
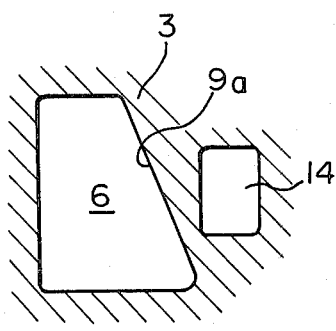
FIG. 7 is a cross-sectional view taken along the line VII—VII in FIG. 4.
Figure 8:
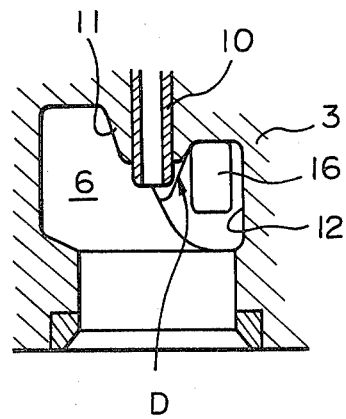
FIG. 8 is a cross-sectional view taken along the line VIII—VIII in FIG. 4.
Figure 9:
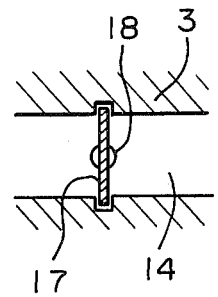
FIG. 9 is a cross-sectional view taken along the line IX—IX in FIG. 5.

FIGS. 3 and 4 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be faced downwards. The width of the inclined wall portion 9a is gradually increased towards the helical portion B, and as illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 8) which is formed on the upper wall of the intake port 6 at a position located around a valve guide 10 of the intake valve 5, and the lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

As illustrated in FIGS. 1 through 5, bypass passages 14, branched off the inlet passage portions A of the corresponding intake ports 6 and having a substantially uniform cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6, and each of the outlet openings 16 of the bypass passages 14 is formed on the upper end portion of the side wall 12 at the helix terminating portion C of the corresponding intake port 6. In addition, slide valves 17 for controlling the flow areas of the corresponding bypass passages 14 are slidably arranged in the corresponding bypass passages 14. Valve rods 18 are formed in one piece on the upper ends of the corresponding slide valves 17, and the upper end portions of the valve rods 18 pass through corresponding guide sleeves 19 fitted into the cylinder head 3 and project upwardly from the cylinder head 3.

Figure 10B:
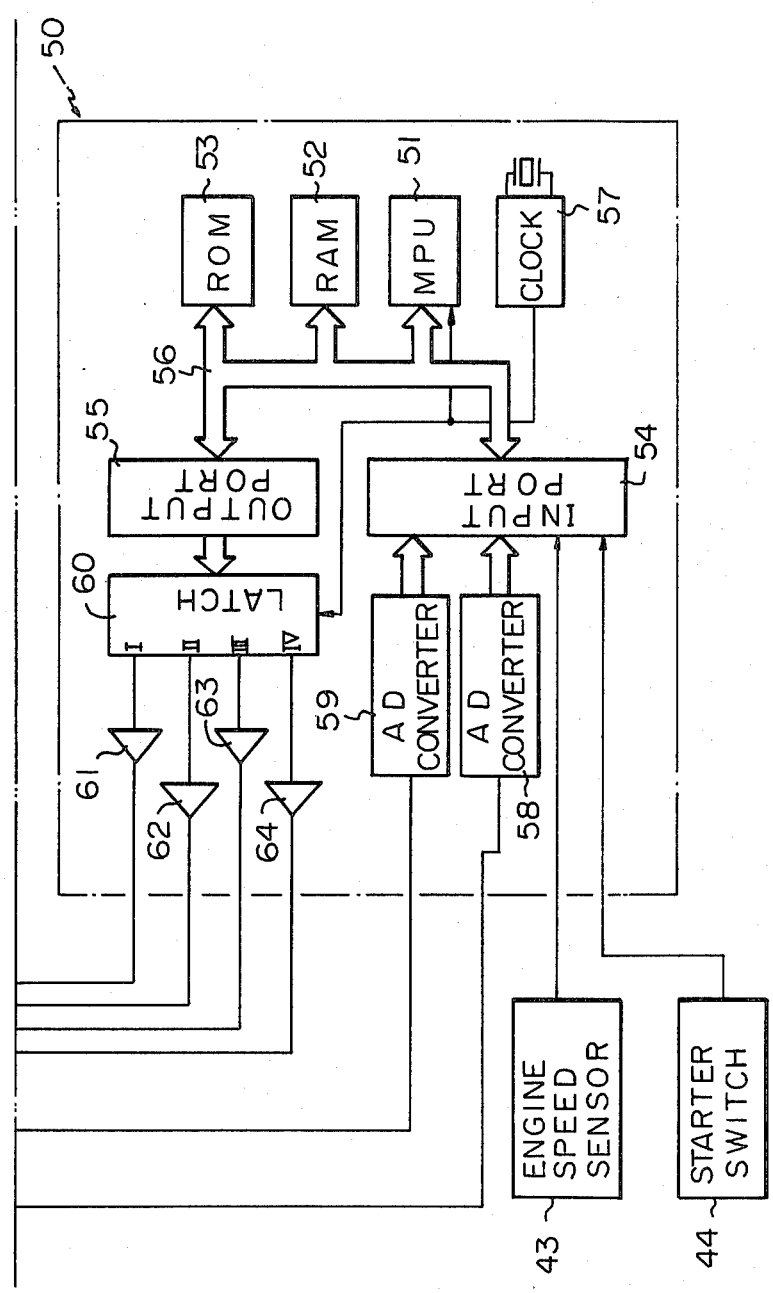

As illustrated in FIG. 10, an arm rod 20 is rotatably mounted on the cylinder head 3 with the bearings (not shown), and arms 21 provided for the slide valves 17 of the corresponding cylinders are fixed onto the arm rod 20. The tips of the arms 21 are connected to the tops of the corresponding valve rods 18 with pins 22, which allow pivot motion. In addition, an arm 23 is fixed onto the arm rod 20, and the tip of the arm 23 is connected to a stepper motor 30. The stepper motor 30, for example, has four poles and adopts a two-phase exciting system. The stepper motor 30 comprises a shaft 32 axially movably, by non-rotatably, supported by a housing 31, a rotor 33 rotatably supported by the housing 31 and having an internal thread which is in engagement with the external thread of the shaft 32, and exciting coils 34 arranged to surround the rotor 33. The exciting coils 34 are connected to the output terminals of an electronic control unit 50. When the rotor 33 rotates, the shaft 32 moves in the axial direction thereof. As a result of this, since the arm 23 connected to the shaft 32 is rotated, the arm rod 20 is accordingly rotated. In addition, a first potentiometer 35 for detecting the flow area of the bypass passage 14 is mounted on the arm rod 20. The potentiometer 35 comprises a slider 36 connected to the arm rod 20 and rotating together with the arm rod 20, and a stationary resistor 37. The slider 36 slides on the stationary resistor 37 contacting with it. Consequently, the voltage, which changes in proportion to the change of opening area of the slide valve 17, is applied to the slider 36. The slider 36 is connected to the input terminal of the electronic control unit 50. In addition, a second potentiometer 40 is connected to a rotary support shaft 39 of an accelerator pedal 38. The second potentiometer 40 comprises a slider 41 and a stationary resistor 42, and the voltage, which changes in proportion to the depression of the accelerator pedal 38, that is, which corresponds to the engine load, is applied to the slider 41. The slider 41 is connected to the input terminal of the electronic control unit 50. In addition, a starter switch 44 and an engine speed sensor 43 for detecting the rotating speed of the crankshaft (not shown) of the engine are connected to the input terminals of the electronic control unit 50.

The electronic control unit 50 is constructed as a digital computer and comprises a microprocessor (MPU) 51 carrying out the arithmetic and logic processing, a random-access memory (RAM) 52, a read-only memory (ROM) 53 storing a predetermined control program and arithmetic constant therein, an input port 54 and an output 55. The MPU 51, the RAM 52, the ROM 53, the input port 54, and the output port 55 are interconnected to each other via a bidirectional bus 56. In addition, the electronic control unit 50 comprises a clock generator 57 generating various clock signals. As illustrated in FIG. 10, the potentiometers 35 and 40 are connected to the input port 54 via AD converters 58 and 59, respectively. In addition, the engine speed sensor 43 and the starter switch 44 are connected to the input port 54. As mentioned above, the first potentiometer 35 produces an output voltage in proportion to the opening area of the slide valve 17. The output voltage of the potentiometer 35 is converted to the corresponding binary code in the AD converter 58, and the binary code is put into the MPU 51 via the input port 54 and the bus 56. In addition, as mentioned above, the second potentiometer 40 produces an output voltage in proportion to the engine load. The output voltage of the potentiometer 40 is converted to the corresponding binary code in the AD converter 59, and the binary code is put into the MPU 51 via the input port 54 and the bus 56. The engine speed sensor 43 produces an output pulse everytime the crankshaft (not shown) of the engine rotates by a certain angle, and the output pulse of the engine speed sensor 43 is put into the MPU 51 via the input port 54 and the bus 56. The starter switch 44 is turned on when the starter motor (not shown) is driven in order to start the engine. The output signal of the starter switch 44 is put into the MPU 51 via the input port 54 and the bus 56.

Figure 11:
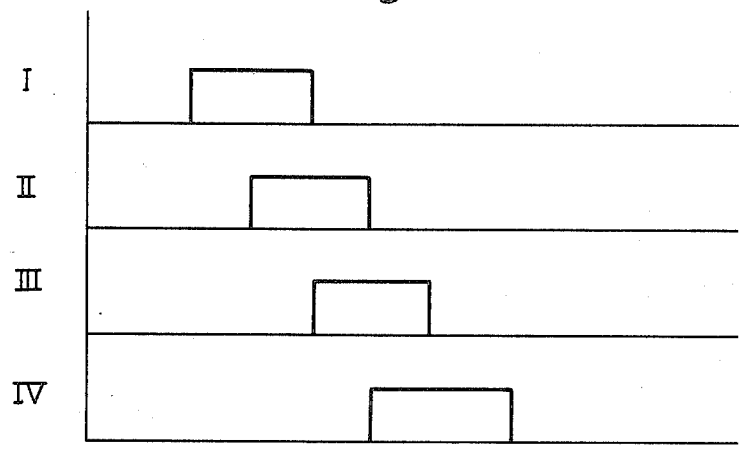
FIG. 11 is a diagram illustrating the stepper motor drive pulses.

The output port 55 is provided for outputting data necessary to actuate the stepper motor 30, and binary coded data is written in the output port 55 from the MPU 51 via the bus 56. The output terminals of the output port 55 are connected to the corresponding input terminals of a latch 60, and the output terminals of the latch 60 are connected to the corresponding exciting coils 34 of the stepper motor 30 via corresponding power amplifiers 61, 62, 63, and 64. As mentioned above, the stepper motor 30 adopts a two-phase exciting system and has first to fourth exciting coils. In order to rotate the stepper motor 30 in one direction, the first exciting coil I, the second exciting coil II, the third exciting coil III, and the fourth exciting coil IV are successively excited as illustrated in FIG. 11. That is, in order to rotate the stepper motor 30 in one direction, it is necessary that four-bit drive data "1100", "0110", "0011", and "1001" be written in turn in the output port 55 and held in the latch 60 so that the output terminals I, II, III, and IV of the latch 60, which are connected to the exciting coils I, II, III, and IV respectively, produce output voltage corresponding to the four-bit drive data for a certain time. Consequently, the exciting pulses illustrated in FIG. 11 can be considered as pulses produced at the output terminals I, II, III, and IV of the latch 60. In addition, the stepper motor 30 can be rotated in the opposite direction by sequentially producing pulses "0011", "0110", "1100" and "1001" at the output terminals I, II, III, and IV of the latch 60. In the manner as described above, the stepper motor 30 is rotated in response to the drive data written in the output port 55.

Figure 12:
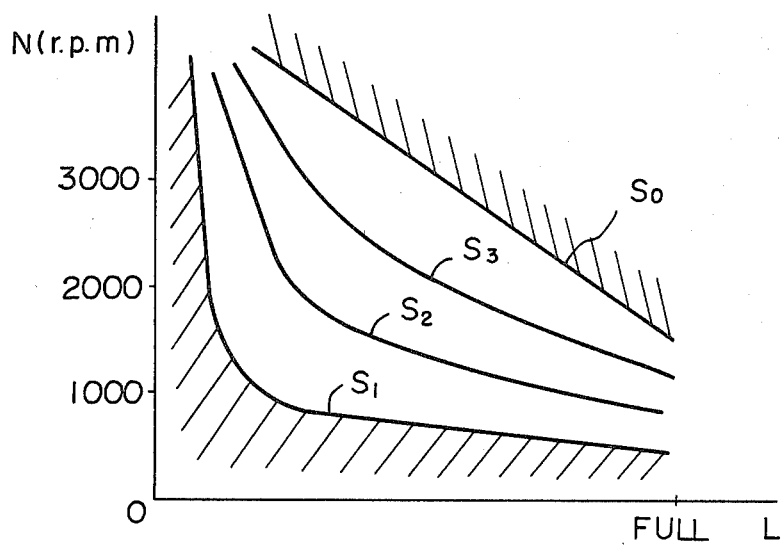
FIG. 12 is a diagram illustrating the opening area of the slide valve.

FIG. 12 illustrates a preferable relationship between the opening area of the slide valve 17 and the engine operating condition determined by the engine speed and the load. In FIG. 12, the ordinate N indicates the engine speed (r.p.m.), and the abscissa L indicates the load of the engine. In addition, the upper region, showed by the hatching above the solid line $S_0$, indicates a region where the slide valve 17 opens the bypass passage 14 to the maximum extent, and the lower region, shown by the hatching below the solid line $S_1$, indicates a region where the slide valve 17 completely shuts off the bypass passage 14. Furthermore, representatively depicted two solid lines $S_2$ and $S_3$, indicate lines on which the opening area of the slide valve 17 is constant. In FIG. 12, the opening area of the slide valve 17 is gradually increased from $S_1$ to $S_0$. The preferable relationship, illustrated in FIG. 12, between the opening area of the slide valve 23 and the engine operating condition determined by the engine speed N and the load L, is stored in the ROM 53 in the form of a function or a data table.

Figure 13B:
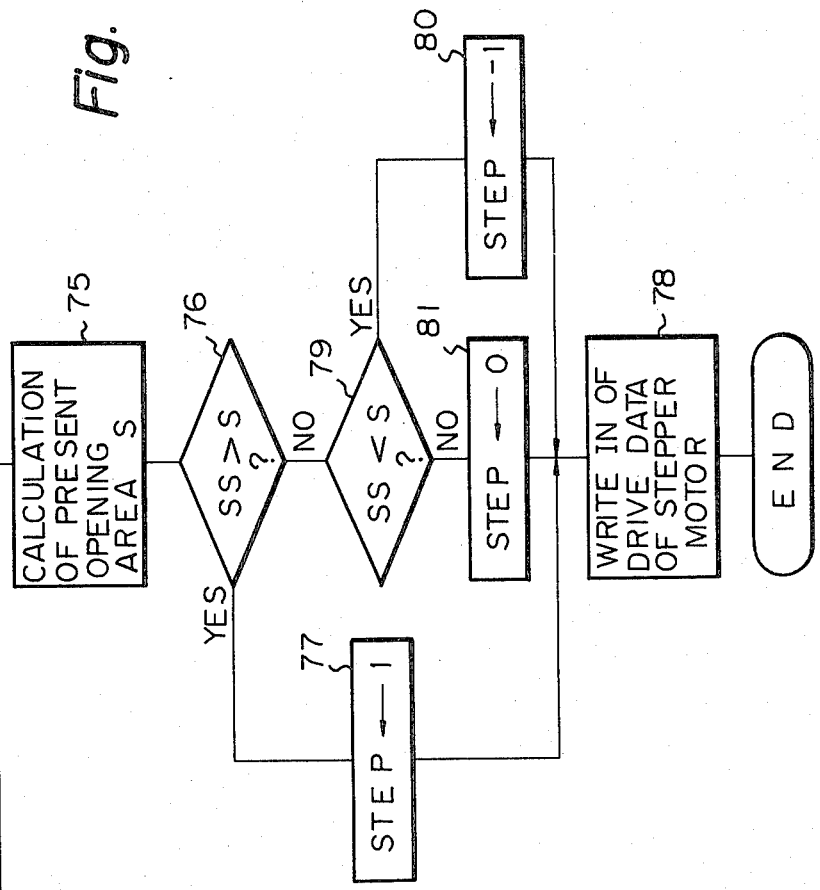

FIG. 13 illustrates a flow chart of the operation of a flow control device according to the present invention. Referring to FIG. 13, step 70 means that the routine is proceeded by sequential interruptions which are executed every predetermined time. Initially, in step 71, it is determined whether the starter switch 44 is on. If the starter switch 44 is not on, the routine goes to step 72. In step 72, the output signal of the engine speed sensor 43 is put into the MPU 51, and the engine speed N is calculated. Then, in step 73, the output signal of the second potentiometer 40, which represents the load L of the engine, is put into the MPU 51. Then, in step 74, the desired opening area SS of the slide valve 17 is calculated by the relationship as illustrated in FIG. 12, which is stored in the ROM 53 on the basis of the load L, and the calculated engine speed N. Then, the routine goes to step 75.

On the other hand, if it is detected in step 71 that the starter switch 71 is on, the routine goes to step 69, and the signal correspond to the maximum opening area is adopted as the desired opening area SS. Then, the routine goes to step 75. In step 75, the output signal of the first potentiometer 35 is put into the MPU 51, and the present opening area of the slide valve 17 is calculated. Then, in step 76, it is determined whether the desired opening area SS is larger than the present opening area S. If the desired opening area SS is larger than the present opening area S, the routine goes to step 77. In step 77, "1" is put into the step number STEP for rotating the stepper motor 30 by one step in the direction of the slide valve 17 opened. Then, the routine goes to step 78. On the other hand, if it is determined in step 76 that the desired opening area SS is not larger than the present opening area S, the routine goes to step 79, and it is determined whether the desired opening area SS is smaller than the present opening area S. If it is determined in step 79 that the desired opening area SS is smaller than the present opening area S, the routine goes to step 80. In step 80, "−1" is put into the step number STEP for rotating the stepper motor 30 by one step in the direction of the slide valve 17 closed. Then, the routine goes to step 78. On the other hand, if it is determined in step 79 that the desired opening area SS is not smaller than the present opening area S, the routine goes to step 81. In step 81, "0" is put into the step number STEP for retaining the stepper motor 30 stationary. Then, the routine goes to step 78. In step 78, the step motor drive data is written in the output port 55 on the basis of the step number STEP obtained in step 77, 80, and 81. As a result of this, the stepper motor 30 is rotated by one step in the direction of the slide valve 17 opened or closed, or the step motor 30 is retained stationary. Consequently, as shown in the flow chart illustrated in FIG. 13, when the starter switch 44 is on, the slide valve 17 opens the bypass passage 14 to the maximum extent. When the starter switch 44 is not on, the slide valve 17 opens or closes until the opening area of the slide valve 17 becomes equal to the desired opening area determined from FIG. 12. From FIG. 12, it is understood that, when the engine is operated at a low speed under a light load, at a high speed under a light load, and at a low speed under a heavy load, the slide valve 17 completely shuts off the bypass passage 14, and that when the engine is operated at a high speed under a heavy load, the slide valve 17 opens the bypass passage 14 to the maximum extent.

As mentioned above, when the engine is operated at a low speed under a light load, at a low speed under a heavy load and at a high speed under a light load, that is, when the amount of air to be fed into the cylinder of the engine is small, the slide valve 17 closes the bypass passage 14. At this time, the air introduced into the inlet passage portion A moves downward, while swirling, along the upper wall 13 of the helical portion B. Then, since the air, while swirling, flows into the combustion chamber 4, a strong swirl motion is created in the combustion chamber 4.

When the engine is operated at a high speed under a heavy load, that is, when the amount of air to be fed into the cylinder of the engine is large, since the slide valve 17 opens the bypass passage 14, the part of the air introduced into the inlet passage portion A is fed into the helical portion B via the bypass passage 14 in which the flow resistance is low. Since the flow direction of the air stream flowing along the upper wall 13 of the helical portion B is deflected downward by the steepling inclined wall D of the helix terminating portion C, a great vacuum is produced at the helix terminating portion C, where the outlet opening 16 of the bypass passage 14 is located. Consequently, since the pressure difference between the vacuum in the inlet passage portion A and the vacuum in the helix terminating portion C becomes large, a large amount of the air is fed into the helical portion B via the bypass passage 14 when the slide valve 17 opens. As mentioned above, when the engine is operated at a high speed under a heavy load, since the slide valve 17 opens, the entire flow area of the intake port 6 is increased, and a large amount of the air is fed into the helical portion B via the bypass passage 14 where the flow resistance is low. As a result of this, it is possible to obtain a high volumetric efficiency. In addition, by forming the inclined wall portion 9a, the flow direction of a part of the air introduced into the inlet passage portion A is deflected downward. As a result of this, since the part of the air flows into the helical portion B along the bottom wall of the intake port 6 without swirling, the flow resistance of the intake port 6 becomes smaller, and thus, makes it possible to further increase a volumetric efficiency when the engine is operated at a high speed under a heavy load.

Further more, in the region between the solid lines $S_1$ and $S_0$ in FIG. 12, if the engine operating condition, which is determined by the engine speed N and the load L, changes in such a manner that the corresponding point moves from $S_1$ to $S_0$, the amount of air to be fed into the cylinders of the engine is increased, the opening area of the slide valve 17 gradually increases.

Figure 18:
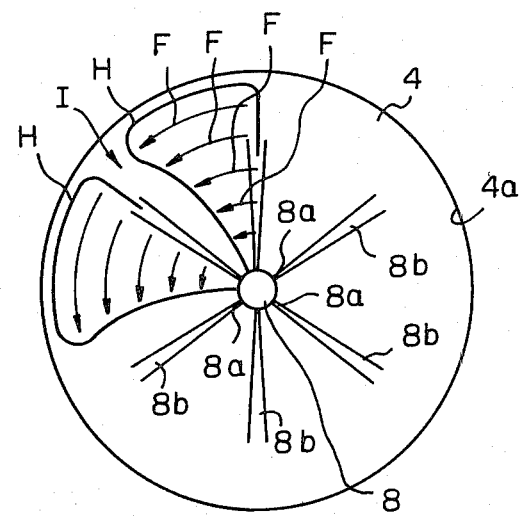
FIG. 18 is a plan view of the combustion chamber, schematically illustrating the relationship between the swirl motion and the fuel injected from the fuel injector.

FIG. 18 schematically illustrates fuel spray 8b injected by the fuel nozzle 8a of the fuel injector 8 into the combustion chamber 4. As mentioned previously, a swirl motion is created in the combustion chamber 4, and this swirl motion rotates about the axis of the fuel injector 8 in a horizontal plane. In FIG. 18, arrows F indicate the moving distance of the air in the period from the start of the injection to the completion of the injection. Thus, the regions, surrounded by the curved lines H which envelopes the arrows F, indicate regions where an air-fuel mixture is formed. Consequently, in the case where a gap I is present between the adjacent curved lines H as illustrated in FIG. 18, only air is present within the gap I. Therefore, if such a gap I is present, since the amount of air used for combustion becomes small, a good combustion cannot be obtained. On the other hand, if the adjacent regions surrounded by the curved lines H are partially superimposed upon each other, since only the air-fuel mixture located within the superimposed region becomes rich, also a good combustion cannot be obtained. Contrary to this, if the leading edge of the region surrounded by the curved line H just meets the trailing edge of the adjacent region surrounded by the curved line H, that means that the air gap I is not present without superimposing the adjacent regions surrounded by the curved lines H to each other, the distribution of fuel becomes uniform, and the amount of air used for combustion becomes maximum. Consequently, at this time, an optimum combustion can be obtained. The period represented with the crank angle in which the fuel spray 8b is injected by the fuel nozzle 8a is determined by the engine load L. Consequently, in order to obtain an optimum combustion, it is necessary to weaken the swirl motion as the engine load L increases. In addition, even if the velocity of the swirl motion is increased in proportion to an increase of the engine speed, the velocity of the fuel spray 8b injected by the fuel injector 8 is not increased so much as the increase of the velocity of the swirl motion. Consequently, when the velocity of the swirl motion is high, since the fuel spray 8b is blown off by the swirling air before the fuel 8b reaches the peripheral region of the swirl motion, the fuel spray 8b cannot reach the peripheral region of the swirl motion. So, it is also necessary to weaken the swirl motion as the engine speed increases.

Figure 15:
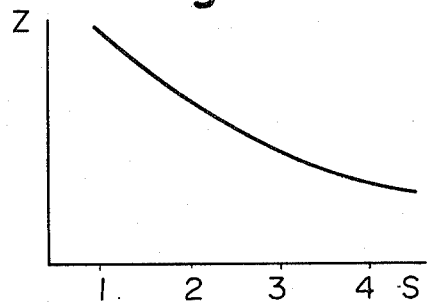
FIG. 15 is a graph illustrating the idling noise.
Figure 16:
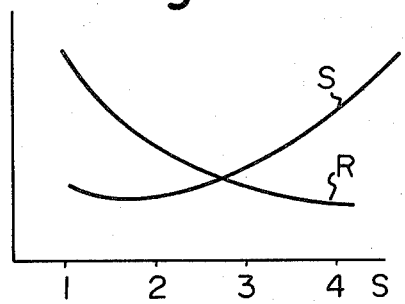
FIG. 16 is a graph illustrating the specific fuel consumption and the amount of unburned HC in the exhaust gas.
Figure 17:
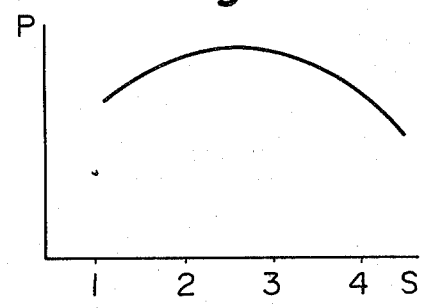
FIG. 17 is a graph illustrating the smoke limit output power.

The ordinate Z of FIG. 15 indicates the noise level in the idling operation. The abscissa S of FIG. 15 indicates a swirl ratio (Times of revolution of the swirl motion for the engine speed). In addition, the abscissa S of FIG. 16 indicates the swirl ratio. In FIG. 16, the curved lines S and R indicate the specific fuel consumption and the amount of unburned HC in the exhaust gas, respectively. When the engine is operated under a light load or a middle load, the specific fuel consumption S and the amount R of unburned HC have a tendency as illustrated in FIG. 16 independently of the engine speed. As shown in FIGS. 15 and 16, at the time of idling, if the swirl motion is weak, that is, if the swirl ratio is small, the air cannot be fully mixed with air and the ignition delay becomes large. As a result, the level of idling noise and the amount of unburned HC are increased. Consequently, in order to reduce the level of noise and the amount of unburned HC at the time of idling, it is preferable to increase the swirl ratio S. However, as is understood from FIG. 16, if the swirl ratio S is increased too much, the specific fuel consumption S deteriorates. Consequently, it is preferable the swirl ratio S equal to about 4. The ordinate p of FIG. 17 illustrates the limit of the power output where the smoke level becomes exceeding high, that is, the smoke limited power output, and the abscissa S indicates the swirl ratio. As is understood from FIG. 17, when the swirl ratio S is in the range of 2 through 3, the smoke limited power output P becomes maximum. Consequently, it is preferable that the swirl ratio S be controlled within the range of 2 through 4 thereof, and it is also preferable that the swirl ratio is reduced as the amount of air to be fed into the cylinders of the engine is increased. In the present invention, when the amount of air fed to be into the cylinder of the engine is small, a strong swirl motion, having the swirl ratio of about 4, can be created by closing the slide valve 17. In addition, by increasing the opening area of the slide valve 17 as the amount of air to be fed into the cylinders of the engine is increased, the swirl ratio S can be gradually reduced. Furthermore, when the amount of air to be fed into the cylinders of the engine is large, the swirl ratio S can be controlled so that it becomes equal to about 2 by opening the slide valve 17 to the maximum extent.

Figure 14:
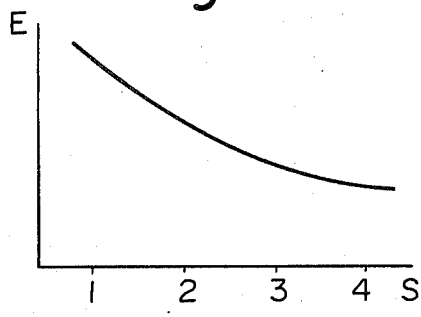
FIG. 14 is a graph illustrating the engine startability.

In FIG. 14, the ordinate E indicates engine startability, and the abscissa S indicates the swirl ratio. If a strong swirl motion is created at the engine starting conditions since the amount of heat which is transferred to the inner wall of the cylinder, is increased, ignition becomes difficult. However, in the present invention, at the time of the engine start, since the swirl ratio S is reduced by opening the slide valve 17 to the maximum extent, a good starting operation of the engine can be obtained.

According to the present invention, when the engine is operated at a low speed under a light load, at a high speed under a light load, and at a low speed under a heavy load, since a strong swirl motion is created in the combustion chamber, it is possible to obtain a stable combustion and suppress the occurrence of noise. In addition, when the engine is operated at a high speed under a heavy load, since the creation of the swirl motion is suppressed, it is possible to obtain a high volumetric efficiency and increase the smoke limited power output. Furthermore, when the engine is operating at a middle speed under a middle load, the swirl motion is weakened as the amount of air to be fed into the cylinder of the engine is increased. As a result of this, since the uniform distribution of fuel is obtained, and the amount of air used for combustion becomes maximum, a good combustion can be obtained. In addition, by weakening the swirl motion at the engine starting conditions, it is possible to obtain an easy start of the engine.

While the invention has been described with reference to a specific embodiment chosen for purposes of illustration, it should be apparent that numerous modifications could be made thereto by those skilled in the art without departing from the spirit and scope of the invention.

We claim:

1. A device for controlling the flow in a helically-shaped intake port of a cylinder head of a diesel engine in order to increase the volumetric efficiency of the engine, said intake port comprising a helical portion around an intake valve, and a substantially straight inlet passage portion tangentially connected to the helical portion and having a helix terminating portion, said device comprising:
   a bypass passage entirely within said cylinder head, said bypass passage having one end directly connected to the inlet passage portion and its other end opening into an upper end of the helix terminating portion of the helical portion such that the flow into the upper end of the helix terminating portion from the bypass portion is in a direction opposite to a swirl flow in the helix terminating portion;
   a slide valve transversely movable in said bypass passage for controlling the flow area of said bypass passage; and
   actuating means for actuating said slide valve in responsive to the change in the amount of air fed into the intake port for increasing the flow area of said bypass passage in proportion to an increase in said amount of air, the opening of the valve reducing the swirl flow and thereby increasing the volumetric efficiency.

2. A device according to claim 1, wherein said bypass passage has a rectangular cross-section.

3. A device according to claim 1, wherein said bypass passage has an outlet opening which is open to the helical portion at a position near a top wall of the helical portion.

4. A device according to claim 3, wherein the top wall of the helical portion has a steeply inclined wall portion at the helix terminating portion, the outlet opening of said bypass passage being arranged near said steeply inclined wall portion.

5. A device according to claim 1, wherein said actuating means comprises a detecting device detecting that the engine is rotated by an external force in order to start the engine and producing a detecting signal for opening said slide valve to the maximum extent in response to the detecting signal of said detecting device when the engine is started.

6. A device according to claim 5, wherein said detecting device comprises a starter switch.

7. A device according to claim 1, wherein the intake passage portion has an inlet open end located furthest from the helical portion, said bypass passage having an inlet opening which is opened to the inlet passage portion at a position near said inlet open end.

8. A device according to claim 7, wherein the intake passage portion comprises an upper wall, a bottom wall, a first side wall located near the intake valve, and a second side wall located remote from the intake valve, said first side wall comprising a downwardly inclined portion located near the helical portion, and a substantially vertical portion located near said inlet open end, the inlet opening of said bypass passage being formed on said vertical portion.

9. A device according to claim 8, wherein the intake port comprises a valve guide projecting into the helical portion from an upper wall of the helical portion and having a circumferential wall, said downwardly inclined portion being tangentially connected to the circumferential wall of said valve guide.

10. A device according to claim 1, wherein said actuating means comprises a control device determining a desired opening area of said slide valve, which is proportional to said amount of air, on the basis of said amount of air and producing a control signal, and an actuator actuating said slide valve in response to said control signal for equalizing the opening area of said slide valve to said desired opening area.

11. A device according to claim 10, wherein said desired opening area is a fixed minimum value when said amount of air is smaller than a predetermined first value, said desired opening area being a fixed maximum valve when said amount of air is larger than a predetermined second value which is larger than said first value.

12. A device according to claim 11, wherein said minimum value is equal to zero.

13. A device according to claim 10, wherein said actuator comprises a stepper motor connected to said slide valve and actuated in response to said control signal.

14. A device according to claim 13, wherein said stepper motor comprises a housing, a shaft connected to said slide valve and axially movably, but non-rotatably, supported by said housing, a rotor screwed onto said shaft and rotatably supported by said housing, and exciting coils excited in response to said control signal for actuating said rotor.

15. A device according to claim 10, wherein said control device comprises a memory in which said desired opening area is stored, and a first detecting device detecting the present opening area of said slide valve and producing a detecting signal, said control device calculating the difference between said desired opening area and said present opening area and producing said control signal which causes the reduction of said difference.

16. A device according to claim 15, wherein said first detecting device comprises a potentiometer connected to said slide valve.

17. A device according to claim 15, wherein said control device comprises an engine speed sensor detecting the engine speed and producing a detecting signal, a second detecting device detecting the engine load and producing a detecting signal, and an electronic control unit calculating said amount of air from the detecting signals of said engine speed sensor and said second detecting device and calculating said difference from the detecting signal of said first detecting device and said desired opening area stored in said memory.

18. A device according to claim 17, wherein the engine includes a manually operated accelerator pedal, and said second detecting device comprises a potentiometer connected to said accelerator pedal.

* * * * *